(12) United States Patent
Vos

(10) Patent No.: US 9,543,072 B2
(45) Date of Patent: Jan. 10, 2017

(54) INDUCTIVE POWER HARVESTER WITH POWER LIMITING CAPABILITY

(71) Applicant: 3M INNOVATIVE PROPERTIES COMPANY, St. Paul, MN (US)

(72) Inventor: Martin J. Vos, St. Paul, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 54 days.

(21) Appl. No.: 14/661,468

(22) Filed: Mar. 18, 2015

(65) Prior Publication Data

US 2016/0276954 A1  Sep. 22, 2016

(51) Int. Cl.
| | |
|---|---|
| *H02M 3/158* | (2006.01) |
| *H01F 27/32* | (2006.01) |
| *H01F 38/14* | (2006.01) |
| *H01F 27/245* | (2006.01) |
| *H01F 27/28* | (2006.01) |
| *H02M 7/217* | (2006.01) |

(52) U.S. Cl.
CPC .......... *H01F 27/327* (2013.01); *H01F 27/245* (2013.01); *H01F 27/2823* (2013.01); *H01F 38/14* (2013.01); *H02M 7/2176* (2013.01)

(58) Field of Classification Search
CPC ...... H02M 1/4208; H02M 1/4225; G05F 1/32; G05F 1/33; G05F 1/38; G05F 1/52; G05F 3/06; Y02B 70/126
USPC ...... 363/74–94; 702/57–62, 64–65, 187, 188
See application file for complete search history.

(56) References Cited

U.S. PATENT DOCUMENTS

| | | | |
|---|---|---|---|
| 4,048,605 A | 9/1977 | McCollum |
| 4,338,649 A | 7/1982 | Mosier |
| 4,384,314 A | 5/1983 | Doty |
| 4,414,521 A | 11/1983 | Reisem |
| 4,414,602 A | 11/1983 | Mosier |
| 4,433,356 A | 2/1984 | Wyatt |
| 4,437,081 A | 3/1984 | Wyatt |
| 4,467,304 A | 8/1984 | Reisem |
| 4,751,401 A | 6/1988 | Beigel |

(Continued)

FOREIGN PATENT DOCUMENTS

| | | |
|---|---|---|
| EP | 1324460 | 7/2003 |
| WO | 2007/121265 | 10/2007 |
| WO | WO 2013/177669 | 12/2013 |

OTHER PUBLICATIONS

Powell, "Current Transformer Burden and Saturation," IEEE Trans. on Industry Applications, May/Jun. 1979, vol. IA-15, No. 3, pp. 294-303.

(Continued)

*Primary Examiner* — Yemane Mehari

(57) ABSTRACT

A power harvester having a current transformer configured to be inductively coupled to a current conductor and a circuit for delivering power to a load. The transformer core has two sections joined together and separable from one another at interleaved portions, allowing the transformer to be installed around the current conductor. The circuit includes a rectifier coupled to the transformer and a transistor coupled in series between the rectifier and a load. The transistor receives an output current from the rectifier and provides power to the load. A resistor is coupled to the transistor and the load, and the transistor and resistor provide for limiting of the power to the load over a wide range of the conductor line currents.

13 Claims, 5 Drawing Sheets

(56) References Cited

U.S. PATENT DOCUMENTS

| | | | |
|---|---|---|---|
| 4,924,181 A | 5/1990 | Huschelrath | |
| 5,327,112 A | 7/1994 | Rossetti | |
| 5,539,261 A | 7/1996 | Roth | |
| 6,043,730 A | 3/2000 | Maenishi | |
| 6,782,513 B1 | 8/2004 | Janik | |
| 7,633,262 B2 | 12/2009 | Lindsey | |
| 8,594,956 B2 * | 11/2013 | Banting | G01R 15/142 324/127 |
| 2010/0084920 A1 | 4/2010 | Banting | |
| 2010/0259185 A1 * | 10/2010 | Sadwick | H03K 17/72 315/291 |
| 2013/0170264 A1 | 7/2013 | Divan et al. | |
| 2013/0301304 A1 | 11/2013 | Murakami et al. | |
| 2014/0071722 A1 | 3/2014 | Gao et al. | |
| 2014/0266102 A1 | 9/2014 | Mikolajczag | |
| 2014/0266240 A1 | 9/2014 | Haensgen | |

OTHER PUBLICATIONS

Storm, Magnetic Amplifiers, p. 55 (1955).
PCT International Search Report for PCT/US2016/021350, mailed Jun. 9, 2016.

* cited by examiner

INDUCTIVE POWER HARVESTER WITH POWER LIMITING CAPABILITY

BACKGROUND

A power harvester is an essential component of power grid monitoring equipment. Power grid monitoring is increasingly pursued by the power industry to improve grid reliability and to reduce liability related to outages and failures. The power harvester can be used to generate power from the existing utility grid infrastructure in order to provide power to sensors and associated equipment for the grid monitoring.

The power harvester uses inductive transformation of electrical power. Inductive transformers taking advantage of electromagnetic phenomena as described by Maxwell's equations. The most common implementation involves a transformer with a relatively fixed efficiency and thus a constant ratio of input versus output power. In that case, the delivered input (primary) power is automatically coupled to the demanded (secondary) power and this constant ratio can extend from watt to megawatt.

Accordingly, a need exists for an improved power harvester, particularly one providing relatively fixed power output over a wide range of primary line currents.

SUMMARY

A power harvester, consistent with the present invention, includes a transformer having a core with an interleaved portion and a coil around the core, where the transformer is configured to be inductively coupled to a current conductor. A rectifier is coupled to the coil, and a transistor is coupled in series between the rectifier and a load. The transistor receives an output current from the rectifier and provides power to the load. A resistor is coupled to the transistor and the load, and the transistor and resistor provide for limiting of the power to the load over a particular range of currents within the current conductor.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Grid performance monitoring is increasingly desired by the power industry to reduce the liability of outages and catastrophic failures. The processing and communication of data gathered from the grid requires a modest amount of power on the order of 10 watts for one such device. This amount of power is most conveniently harvested inductively from a current carrying conductor.

Embodiments of the present invention address the challenge involving a more or less fixed secondary power of approximately 10 watts, for example, to be transformed over a large range of primary conductor currents that can vary from about 50 to 1000 amperes or even higher. The power harvester circuit maintains a relatively constant power delivery over such a large current range. The transformation should be made efficient for low line currents and should become increasingly less efficient for higher line currents. An additional aspect involves power diversion to an auxiliary load for higher line currents so that the required essential circuitry power stays as constant as possible. Other amounts of relatively fixed output power can be generated depending upon, for example, the components powered by the harvester circuit.

Figure 1:
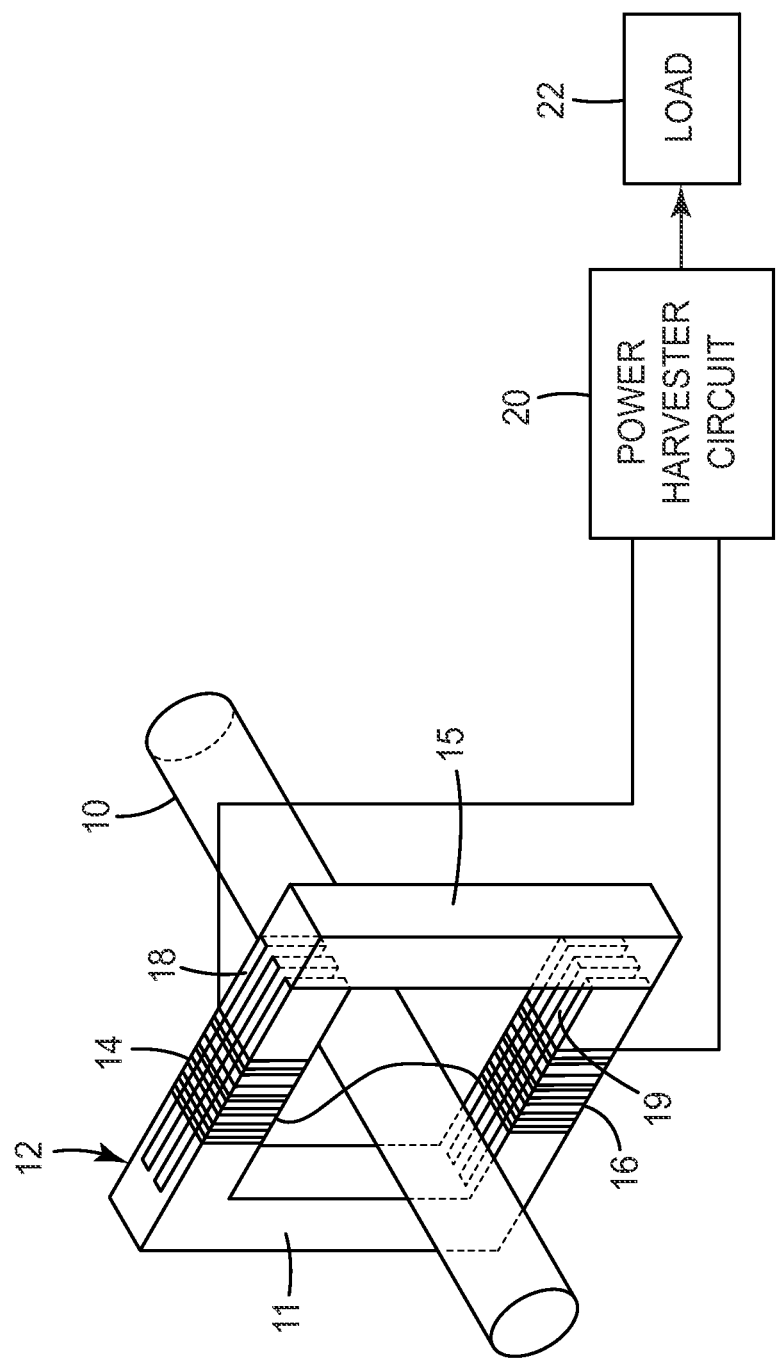
FIG. 1 is a block diagram of a power harvester.

FIG. 1 is a block diagram of a power harvester. The power harvester includes a transformer 12 and a power harvester circuit 20 providing power to a load 22. Transformer 12 is situated around a primary line conductor 10 and inductively coupled to it. Transformer 12 includes a core comprised of a first section 11 and second section 15. The core includes a first coil 14 and a second coil 16 coupled together in series. The coils 14 and 16 can be implemented with an insulated electrical conductor, such as copper wire, wrapped around portions of the core. Sections 11 and 15 are joined together at a first interleaved portion 18 and a second interleaved portion 19. Power harvester circuit 20 is electrically coupled to coils 14 and 16, receives current from the coils, and delivers a relatively constant power to load 22.

Figure 2:
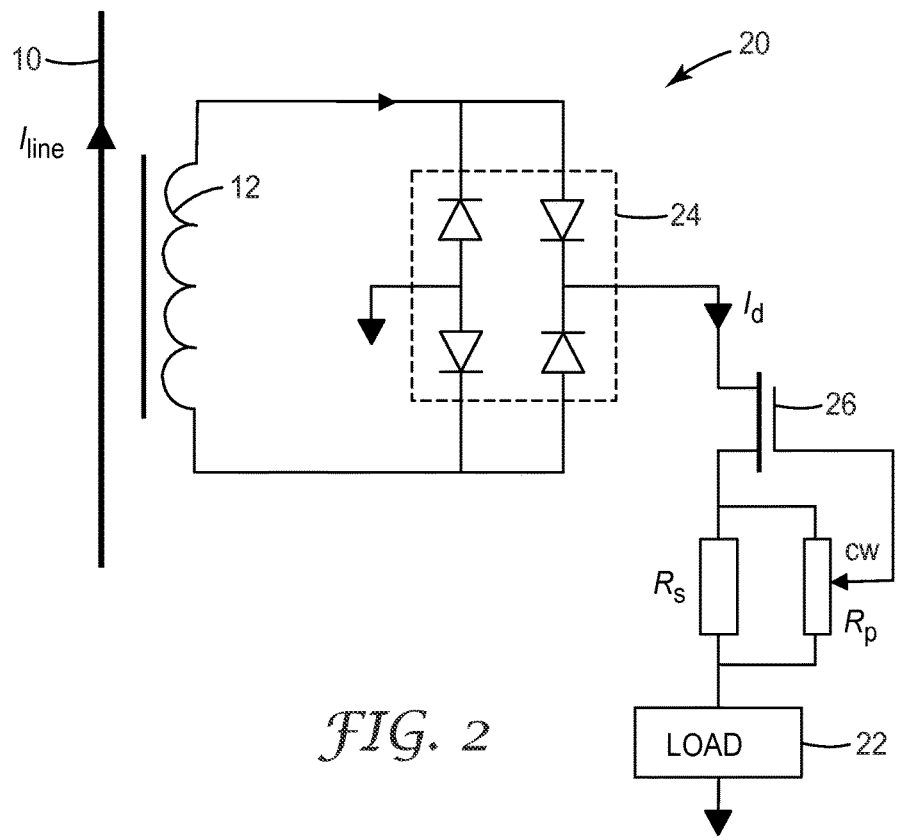
FIG. 2 is a circuit diagram for implementing the power harvester with current sensing.
Figure 3:
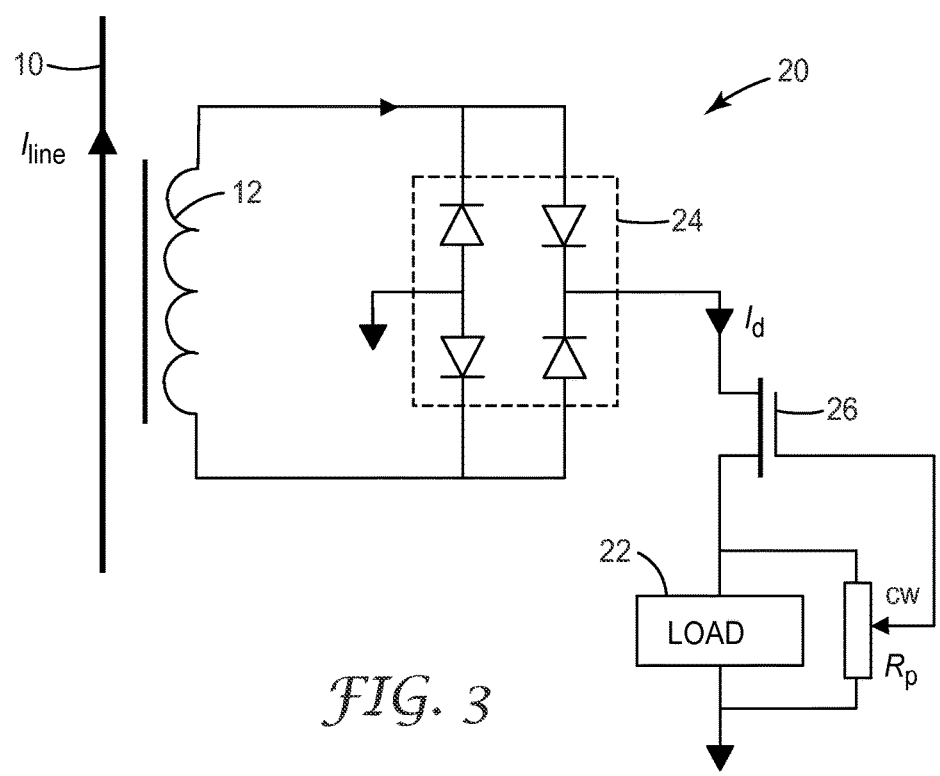
FIG. 3 is a circuit diagram for implementing the power harvester with voltage sensing.

FIGS. 2 and 3 are circuit diagrams for implementing power harvester circuit 20 in two configurations, current sensing and voltage sensing. As shown in FIGS. 2 and 3, circuit 20 includes a rectifier, implemented as a diode bridge 24, coupled in parallel with transformer 12. Transformer 12 is inductively coupled to primary line conductor 10 having a line current $I_{line}$. A depletion transistor 26 has a drain terminal coupled to and receiving a current signal $I_d$ from diode bridge 24, a source terminal providing power to load 22, and a gate terminal coupled to a variable resistor (potentiometer) $R_p$. In the current sensing configuration of FIG. 2, the source terminal of transistor 26 is coupled in series with a sense resistor $R_s$ and load 22, and variable resistor $R_p$ is coupled in parallel with sense resistor $R_s$. In the voltage sensing configuration of FIG. 3, the source terminal of transistor 26 is coupled in series with load 22, and variable resistor $R_p$ is coupled in parallel with load 22. Power harvester circuit 20 is configured to force the transformer core (sections 11 and 15) into saturation in order to provide for limiting the power output to load 22 over a wide range of line currents $I_{line}$. Also, this particular configuration of the power harvester can provide for a relatively low cost solution to harvesting power from a primary current conductor.

Transistor 26 can be simply implemented with a depletion N-channel MOSFET. The depletion MOSFET is normally conducting with a very small drain-source channel resistance, typically less than 0.1Ω, so that the power harvester will always provide some power at startup and low line currents $I_{line}$. For larger line currents $I_{line}$, the corresponding gate-source voltage $V_{gs}$ increase of transistor 26 will increase the drain-source channel resistance and limit the power delivered to the load. In this case, the sense resistor $R_s$=1.5Ω and the potentiometer $R_p$=10Ω. The load can be any component capable of being powered by the harvester circuit. Examples of load devices include sensors for smart grid monitoring. The load may also contain a parallel capacitor of for instance 5 mF to reduce voltage ripple over the load. The load may furthermore contain a parallel high wattage zener diode of for instance 15 V to clamp the load voltage during for instance extreme high line current fault events.

Transformer 12 has an improved core via interleaving of sections 11 and 15, as illustrated in the perspective view of FIG. 1. In particular, the interleaving reduces the undesirable reluctance increase from the air gap between sections 11 and 15 when joined together. It can be shown that the reluctance is multiplied by a factor M when an air gap g is created in a flux path of length l and relative core permeability $\mu_r$:

$$M = 1 + (\mu_r - 1)\frac{2g}{l}$$

For example, when a small air gap of g=50 μm is created in a continuous core of length l=0.5 meter with relative permeability $\mu_r$=5000, the reluctance is doubled. The increased reluctance reduces the power delivering capability at low line currents. Interleaving as described below reduces reluctance and increases power delivering capability at low line currents.

Figure 4:
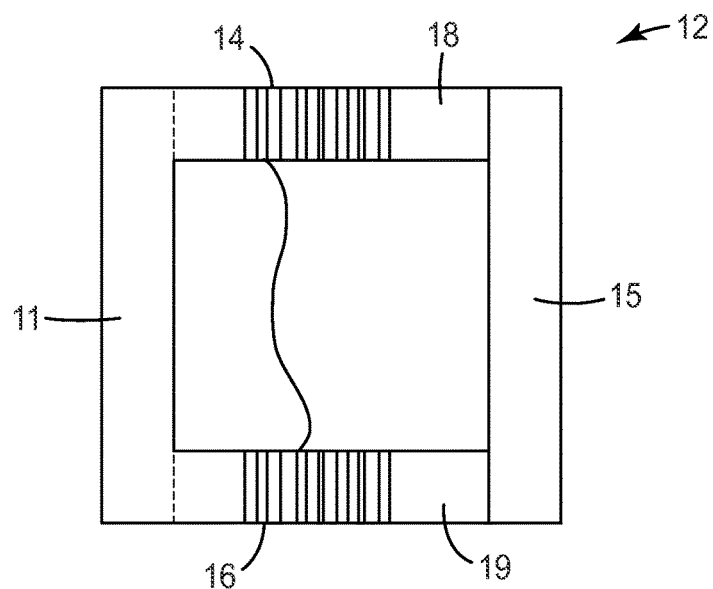
FIG. 4 is a side view of the transformer for the power harvester.
Figure 5:
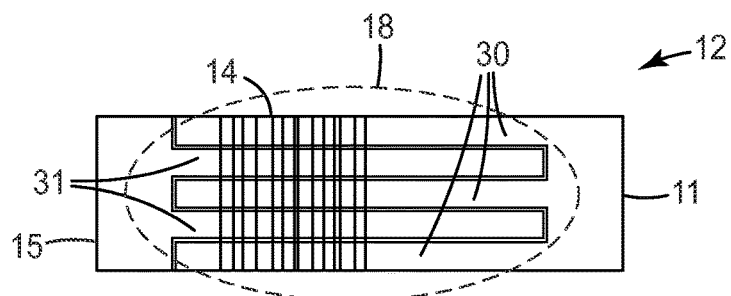
FIG. 5 is a top view of the transformer as assembled.
Figure 6:
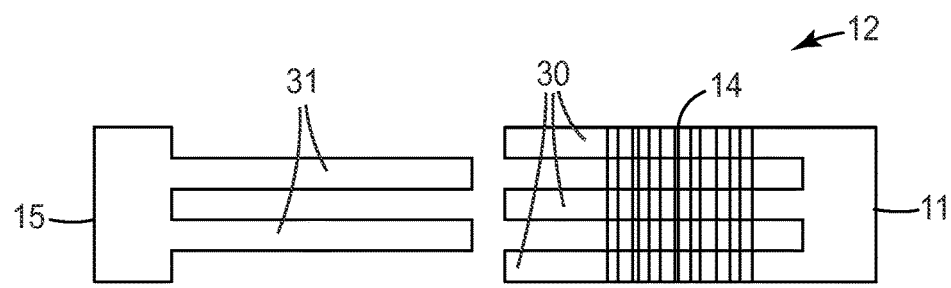
FIG. 6 is a top view of the transformer as disassembled.

FIG. 4 is a side view of transformer 12 for the power harvester. FIGS. 5 and 6 are top views of transformer 12 as assembled and disassembled, respectively. Section 11 is coupled with section 15 via interleaved portions 18 and 19. As shown in FIGS. 5 and 6, interleaved portion 18 includes leaf packages on sections 11 and 15. In particular, protrusions 30 on section 11 are interleaved with protrusions 31 on section 15. Interleaved portion 19 can be configured in the same or a similar way as interleaved portion 18. The interleaved portions preferably have 5-7 leaf packages, and the example shown in FIGS. 4-6 has five leaf packages. Instead of having two interleaved portions, the transformer core can have one interleaved portion and another non-interleaved portion such as a planar interface. Although interleaved portions 18 and 19 are shown with rectangular shaped protrusions, they can have other configurations such as tapered protrusions. With such interleaving, an imaginary closed flux line running along the core will not have to cross a perpendicular core-gap interface. Instead, the flux line may flow crossing the non-perpendicular interface between leaf packs. The net effect is a reduced reluctance compared to the non-interleaved case.

Figure 7:
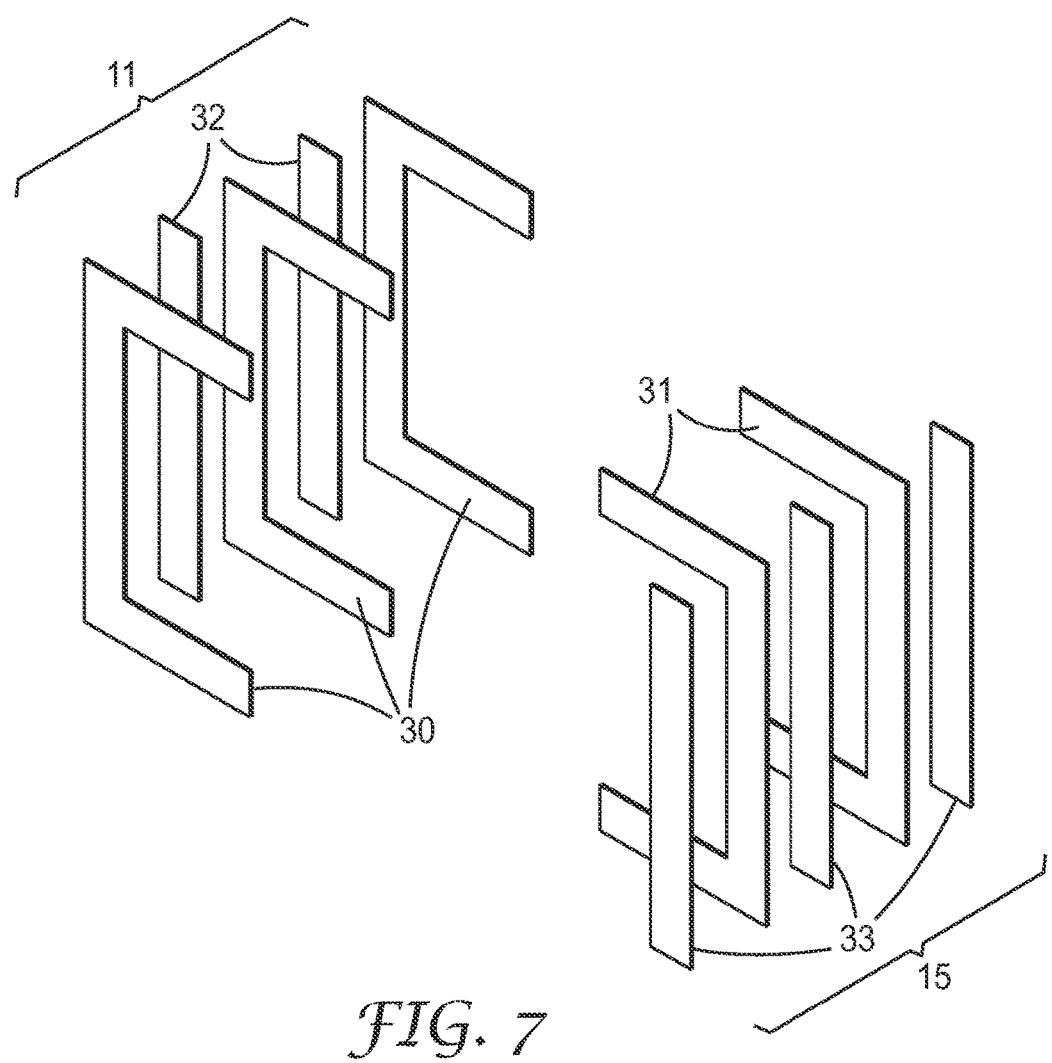
FIG. 7 is a perspective view of the transformer core when comprised of U-shaped and I-shaped portions as disassembled.

FIG. 7 is a perspective view of the transformer core when comprised of U-shaped and I-shaped portions as disassembled. This exemplary implementation uses U-shaped portions to provide for the protrusions 30 and 31, and uses I-shaped portions 32 and 33 to space apart the U-shaped portions so that the protrusions 30 and 31 can form leaf packets for the interleaved portions. Each of the U-shaped and I-shaped portions can be composed of a single sheet of material or multiple sheets laminated or otherwise held together.

Section 11 is separable from section 15 via interleaved portions 18 and 19, allowing for transformer 12 to be assembled around a primary line conductor in the field, for example. The transformer core can be implemented with, for example, laminated sheets of high permeability transformer steel. Although transformer 12 is shown having a U-shaped portions and I-shaped portions, other configurations are possible. One particular embodiment of the transformer for a 10 W, 12 V case has a 50/50/5 combination, meaning 50 turns and 50 sheets of 14 mil thickness steel with 5 sub-laminates, providing a transformer core cross-sectional area of about 8 cm².

Figure 8:
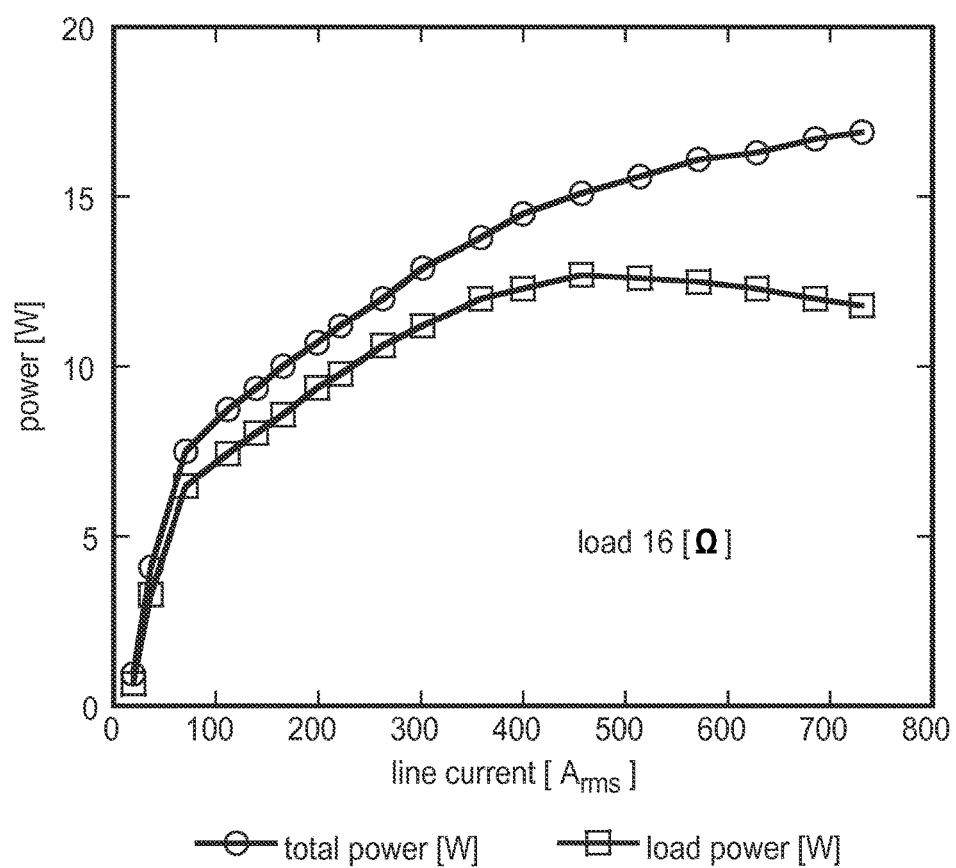
FIG. 8 is a graph of output power for an exemplary implementation of the power harvester.

In an exemplary implementation of the power harvester, the potentiometer $R_p$ was adjusted so that the desired power level was obtained for a particular line current as shown in FIG. 8. Power limiting is clearly visible with the delivered load power close to 10 W over a large line current range. The total power coming directly from the transformer will always increase with increasing line current, but for the load power some slight power reduction is visible for high line currents. The reduction is a result of the core operating in the linear regime during a shorter time because the fraction of time when the core is saturated during a (50/60 Hz) cycle increases at higher line currents.

The invention claimed is:

1. A power harvester, comprising:
   a transformer having a core and a coil around the core, wherein the core has an interleaved portion and the transformer is configured to be inductively coupled to a current conductor, wherein the core comprises a first section and a second section, the first section is separable from the second section at the interleaved portion, and the interleaved portion comprises first protrusions on the first section alternating with second protrusions on the second section;
   a rectifier coupled to the coil;
   a transistor coupled in series between the rectifier and a load, wherein the transistor receives an output current from the rectifier and provides power to the load; and
   a resistor coupled to the transistor and the load,
   wherein the transistor and resistor provide for limiting of the power to the load over a particular range of currents within the current conductor.

2. The power harvester of claim 1, wherein the rectifier comprises a diode bridge.

3. The power harvester of claim 1, wherein the transistor comprises a depletion transistor.

4. The power harvester of claim 1, wherein the resistor is coupled in series between the transistor and the load.

5. The power harvester of claim 1, wherein the load contains a parallel capacitor.

6. The power harvester of claim 1, wherein the load contains a parallel zener diode.

7. The power harvester of claim 1, wherein the resistor is coupled in parallel with the load.

8. The power harvester of claim 1, wherein core comprises laminated steel sheets.

9. The power harvester of claim 1, wherein the coil is around the interleaved portion.

10. The power harvester of claim 1, wherein the interleaved portion is comprised of rectangular shaped protrusions.

11. The power harvester of claim 1, wherein the coil comprises a first coil of insulated wire around a first part of the core and a second coil of insulated wire around a second part of the core opposite the first part, and the first coil is coupled in series with the second coil.

12. The power harvester of claim 1, wherein the first and second sections are each comprised of U-shaped portions and I-shaped portions, and the I-shaped portions space apart the U-shaped portions to form the first and second protrusions.

13. The power harvester of claim 1, further comprising another interleaved portion, wherein the another interleaved portion comprises third protrusions on the first section alternating with fourth protrusions on the second section, and the first section is separable from the second section at the another interleaved portion.

* * * * *

UNITED STATES PATENT AND TRADEMARK OFFICE
CERTIFICATE OF CORRECTION

| | | |
|---|---|---|
| PATENT NO. | : 9,543,072 B2 | Page 1 of 1 |
| APPLICATION NO. | : 14/661468 | |
| DATED | : January 10, 2017 | |
| INVENTOR(S) | : Vos | |

It is certified that error appears in the above-identified patent and that said Letters Patent is hereby corrected as shown below:

In the Specification

Column 2
Line 66, Delete "$Rp=10\Omega$." and insert -- $Rp=10k\Omega$. --, therefor.

Signed and Sealed this
Thirtieth Day of May, 2017

Michelle K. Lee
*Director of the United States Patent and Trademark Office*